(12) United States Patent
Miyagi et al.

(10) Patent No.: US 10,946,314 B2
(45) Date of Patent: Mar. 16, 2021

(54) PRESSURE CONTROL DEVICE

(71) Applicant: NIDEC TOSOK CORPORATION, Kanagawa (JP)

(72) Inventors: Masaru Miyagi, Kanagawa (JP); Kenichi Ozawa, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/787,032

(22) Filed: Feb. 11, 2020

(65) Prior Publication Data

US 2020/0276524 A1  Sep. 3, 2020

(30) Foreign Application Priority Data

Feb. 28, 2019 (JP) .............................. JP2019-035170

(51) Int. Cl.
| | |
|---|---|
| *B01D 29/05* | (2006.01) |
| *B01D 29/58* | (2006.01) |
| *F16K 11/07* | (2006.01) |
| *F01M 1/16* | (2006.01) |
| *F01M 1/10* | (2006.01) |

(52) U.S. Cl.
CPC ............ *B01D 29/05* (2013.01); *B01D 29/58* (2013.01); *B01D 2201/30* (2013.01); *B01D 2201/34* (2013.01); *F01M 1/10* (2013.01); *F01M 1/16* (2013.01); *F01M 2001/1007* (2013.01); *F16K 11/07* (2013.01)

(58) Field of Classification Search
CPC ............ B01D 2201/30; B01D 2201/34; B01D 29/05; B01D 29/58; F01M 1/10; F01M 1/16; F01M 2001/1007; F15B 21/041; F15B 13/0402; F16H 61/143; F16K 11/07; F16K 27/041; F16K 37/0033

See application file for complete search history.

(56) References Cited

U.S. PATENT DOCUMENTS

| | | | | |
|---|---|---|---|---|
| 3,372,807 | A * | 3/1968 | Barnard | .................... F01P 11/06 210/94 |
| 4,615,413 | A * | 10/1986 | Stevenson | .............. F01M 11/10 184/108 |
| 4,661,255 | A * | 4/1987 | Aumann | .............. B01D 39/083 210/491 |

(Continued)

FOREIGN PATENT DOCUMENTS

JP  2014234829  12/2014

*Primary Examiner* — Terry K Cecil
(74) *Attorney, Agent, or Firm* — JCIPRNET

(57) ABSTRACT

A pressure control device is provided and includes a body which has a groove-shaped flow path including a groove part and a widened part connected to the groove part and having a width larger than a width of the groove part, and a filter unit which captures foreign matters mixed in a fluid which passes through the groove-shaped flow path. The filter unit includes a frame body being in a cylindrical shape and including a through hole part which penetrates in a direction along a central axis, and at least one filter member being in a planar plate shape disposed to intercept the through hole part and supported inside the frame body, in which the filter unit is accommodated in the widened part so that a direction orthogonal to the central axis of the frame body is along a depth direction of the widened part.

15 Claims, 11 Drawing Sheets

(56) References Cited

U.S. PATENT DOCUMENTS 6,613,220 B2 * 9/2003 Golovatai-Schmidt ..................... B01D 35/147
123/19 A
9,488,268 B2 * 11/2016 Yamada .............. F16H 61/0021

* cited by examiner

PRESSURE CONTROL DEVICE

CROSS REFERENCE TO RELATED APPLICATIONS

This application claims the priority benefit of Japanese Patent Application No. 2019-035170, filed on Feb. 28, 2019. The entirety of the above-mentioned patent application is hereby incorporated by reference herein and made a part of this specification.

FIELD OF THE INVENTION

The disclosure relates to a pressure control device.

BACKGROUND

Regarding an oil pressure control device for controlling an oil pressure, for example, an oil pressure control device mounted on an automobile for the clutch is known. The oil pressure control device includes a body having a flow path through which hydraulic oil passes, and a filter in a circular cylindrical shape that is provided in the middle of the flow path and captures foreign matters such as powder mixed in the hydraulic oil.

Further, in general, in an oil pressure control device, when a filter is inserted into a flow path of a body and these members are assembled together to manufacture the oil pressure control device, the assembly work is often performed manually, for example.

However, in the oil pressure control device, the thinner the flow path is (that is, the smaller the width of the flow path is), the more difficult it is to perform the insertion work of the filter into the flow path. Therefore, there has been a problem that the efficiency of assembly work of the body and the filter is low.

SUMMARY

An aspect of a pressure control device of the disclosure includes: a body which has a groove-shaped flow path including a groove part and a widened part connected to the groove part and having a width larger than a width of the groove part; and a filter unit which captures foreign matters mixed in a fluid which passes through the groove-shaped flow path, wherein the filter unit includes a frame body being in a cylindrical shape and including a through hole part which penetrates in a direction along a central axis, and at least one filter member being in a planar plate shape disposed to intercept the through hole part and supported inside the frame body, wherein the filter unit is accommodated in the widened part so that a direction orthogonal to the central axis of the frame body is along a depth direction of the widened part.

The above and other elements, features, steps, characteristics and advantages of the present disclosure will become more apparent from the following detailed description of the preferred embodiments with reference to the attached drawings.

DETAILED DESCRIPTION

Hereinafter, a pressure control device of the disclosure will be described in detail based on preferred embodiments shown in the accompanying drawings.

In each drawing, the Z-axis direction is the vertical direction Z. The X-axis direction is the left-right direction X in the horizontal direction orthogonal to the vertical direction Z. The Y-axis direction is the axial direction Y orthogonal to the left-right direction X in the horizontal direction orthogonal to the vertical direction Z. The positive side in the vertical direction Z is referred to as "the upper side," and the negative side is referred to as "the lower side." The positive side in the axial direction Y is referred to as "the front side," and the negative side is referred to as "the rear side." The front side corresponds to the one side in the axial direction, and the rear side corresponds to the other side in the axial direction. In the embodiment, the depth direction of a groove part is the vertical direction, and this is the Z-axis direction. Moreover, the width direction of the groove part orthogonal to the Z-axis direction is the X-axis direction. Further, the length direction (longitudinal direction) of the groove part (that is, a flow direction of a fluid) orthogonal to the Z-axis direction and the X-axis direction, respectively, is the Y-axis direction. Further, the upper side, the lower side, the front side, the rear side, the vertical direction, and the left-right direction are simply names for describing the relative positional relationship of each part, and the actual dispositional relationship and the like may be a dispositional relationship and the like other than the dispositional relationship and the like indicated by these names. Further, a "plan view" refers to a state viewed from the upper side toward the lower side.

Hereinafter, a first embodiment of the pressure control device of the disclosure will be described with reference to FIG. 1 to FIG. 7.

Figure 1:
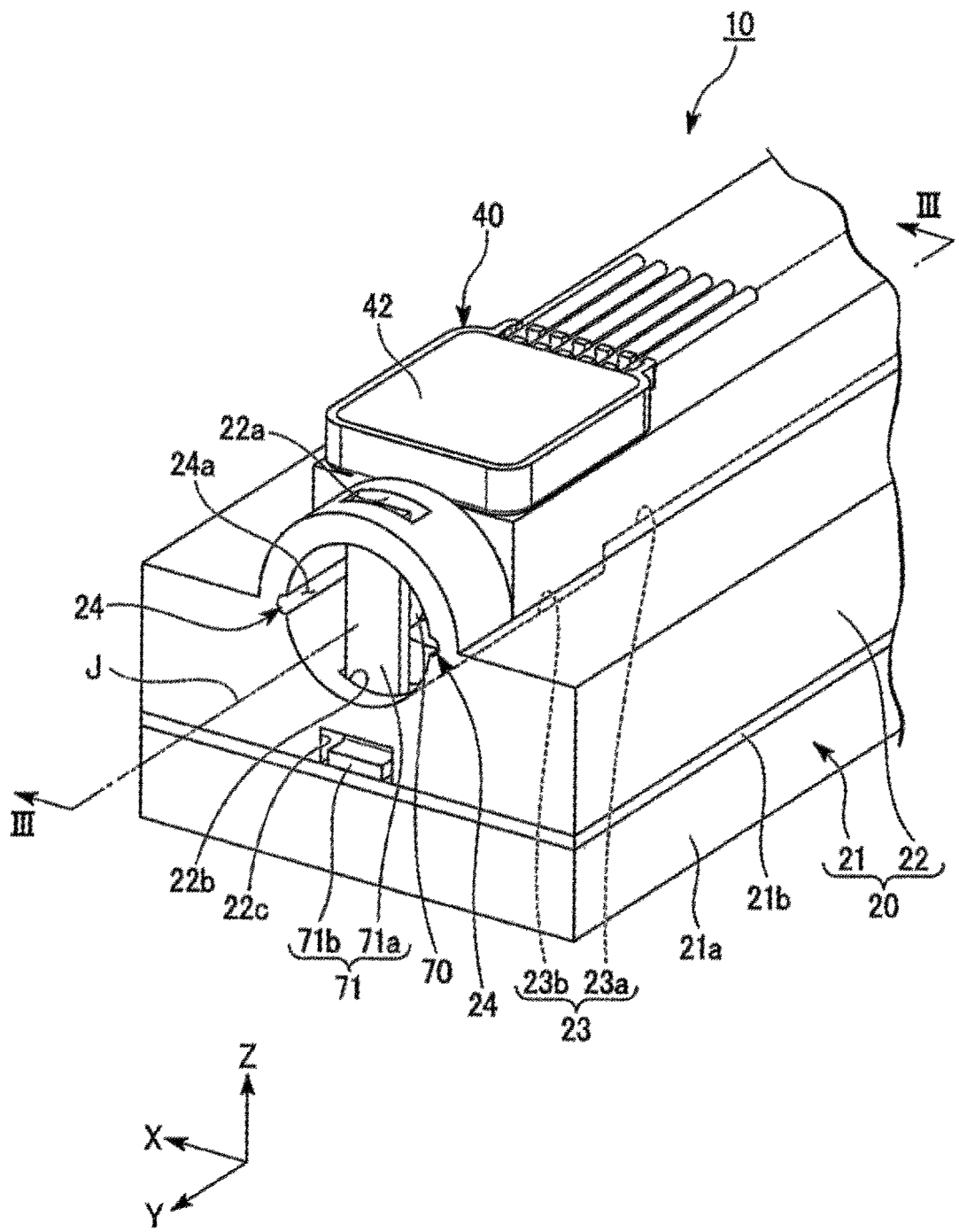
FIG. 1 is a perspective view showing a pressure control device (the first embodiment) of the disclosure.
Figure 2:
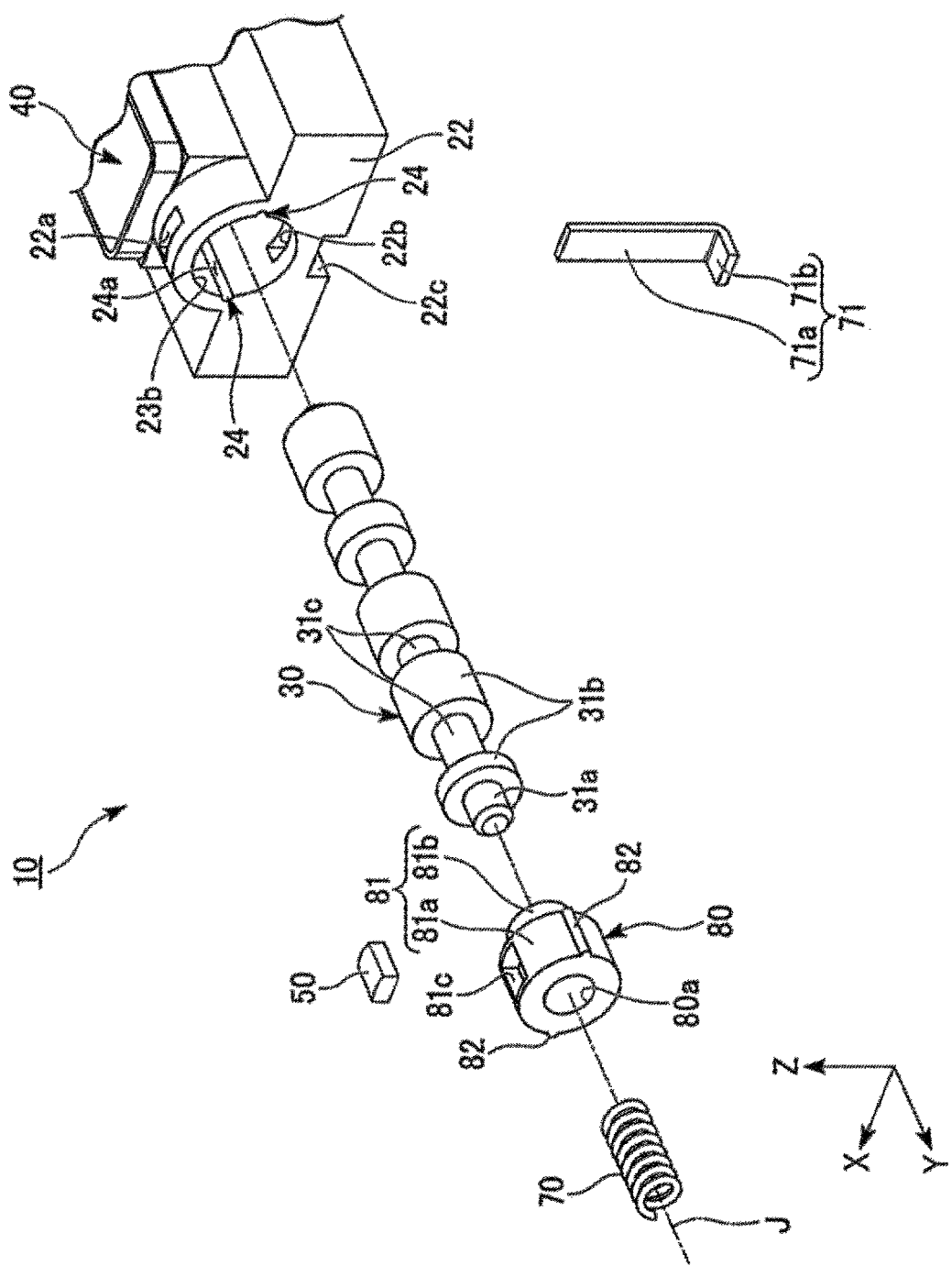
FIG. 2 is an exploded perspective view of the pressure control device shown in FIG. 1.

A pressure control device 10 of the embodiment shown in FIG. 1 and FIG. 2 is, for example, a control valve mounted on a vehicle. The pressure control device 10 includes an oil passage body 20, a spool valve 30, a magnet holder 80, a magnet 50, an elastic member 70, a fixing member 71, and a sensor module 40.

Figure 3:
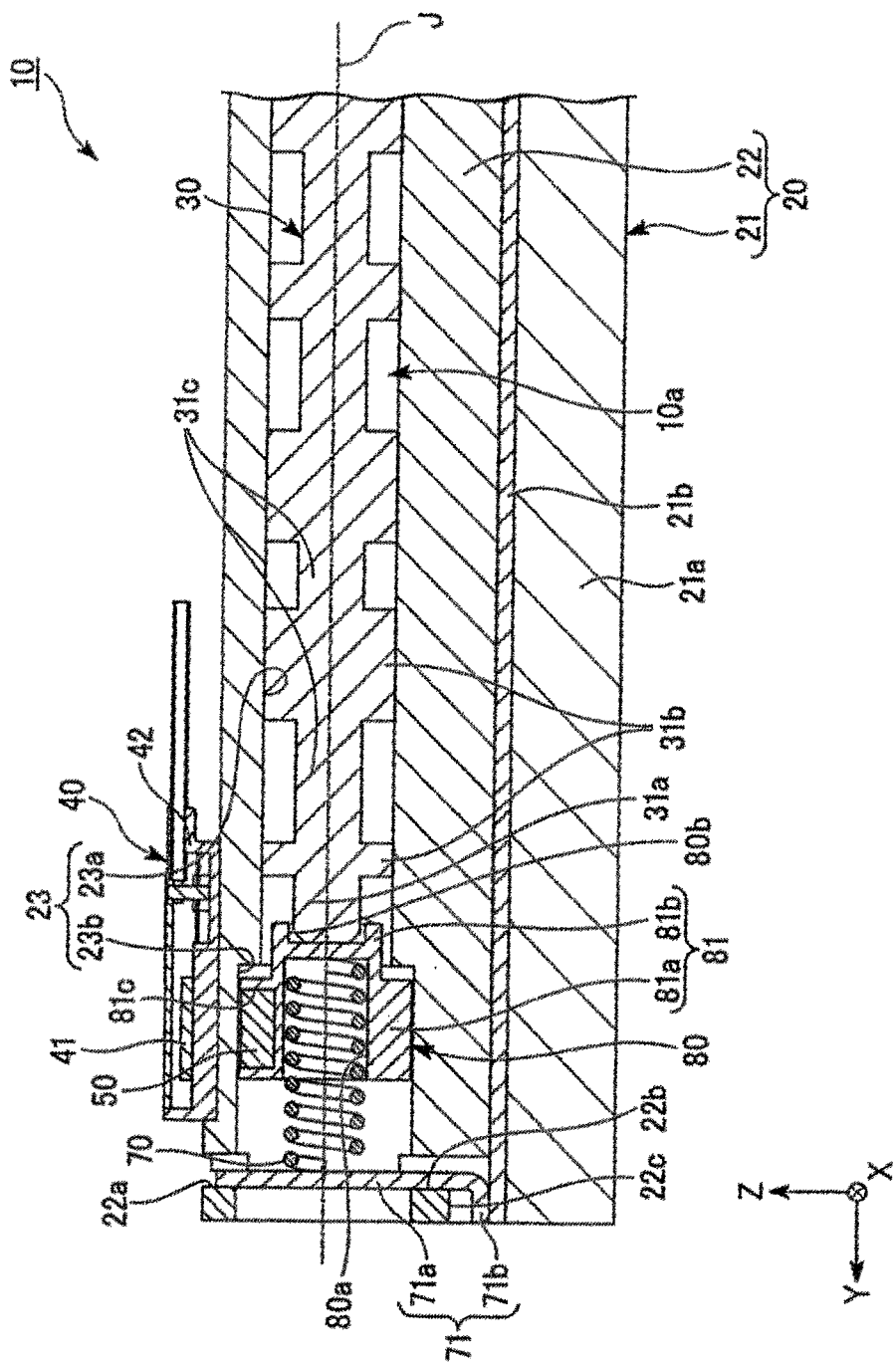
FIG. 3 is a cross-sectional view taken along the line III-III in FIG. 1.

As shown in FIG. 3, the oil passage body 20 includes therein an oil passage 10a through which oil flows. The part of the oil passage 10a indicated in FIG. 3 is a part of a spool hole 23 (to be described later). Each drawing shows a state in which a part of the oil passage body 20 is cut out, for example. As shown in FIG. 1, the oil passage body 20 includes a lower body 21 and an upper body 22. Though omitted in the drawings, for example, the oil passage 10a is provided in both the lower body 21 and the upper body 22.

The lower body 21 includes a lower body main body 21a and a separate plate 21b disposed to overlap the upper side of the lower body main body 21a. In the embodiment, the upper surface of the lower body 21 corresponds to the upper surface of the separate plate 21b and is orthogonal to the vertical direction Z. The upper body 22 is disposed to overlap the upper side of the lower body 21. The lower surface of the upper body 22 is orthogonal to the vertical direction Z. The lower surface of the upper body 22 contacts the upper surface of the lower body 21, that is, the upper surface of the separate plate 21b.

As shown in FIG. 3, the upper body 22 includes the spool hole 23 extending in the axial direction Y. In the embodiment, the cross-sectional shape of the spool hole 23 orthogonal to the axial direction Y is a circular shape with a central axis J as the center. The central axis J extends in the axial direction Y. Further, a radial direction with the central axis J as the center is simply referred to as "the radial direction," and a circumferential direction with the central axis J as the center is simply referred to as "the circumferential direction."

The spool hole 23 opens at least on the front side. In the embodiment, the rear end of the spool hole 23 is closed. That is, the spool hole 23 is a hole that opens on the front side and has a bottom part. Further, the spool hole 23 may open on both sides in the axial direction Y, for example. At least a part of the spool hole 23 forms a part of the oil passage 10a in the oil passage body 20.

The spool hole 23 includes a spool hole main body 23a and a guiding hole part 23b. Though omitted in the drawings, the oil passage 10a provided in a part other than the spool hole 23 in the oil passage body 20 opens on the inner circumferential surface of the spool hole main body 23a. The inner diameter of the guiding hole part 23b is larger than the inner diameter of the spool hole main body 23a. The guiding hole part 23b is connected to the front-side end part of the spool hole main body 23a. The guiding hole part 23b is the front-side end part of the spool hole 23 and opens on the front side.

Figure 4:
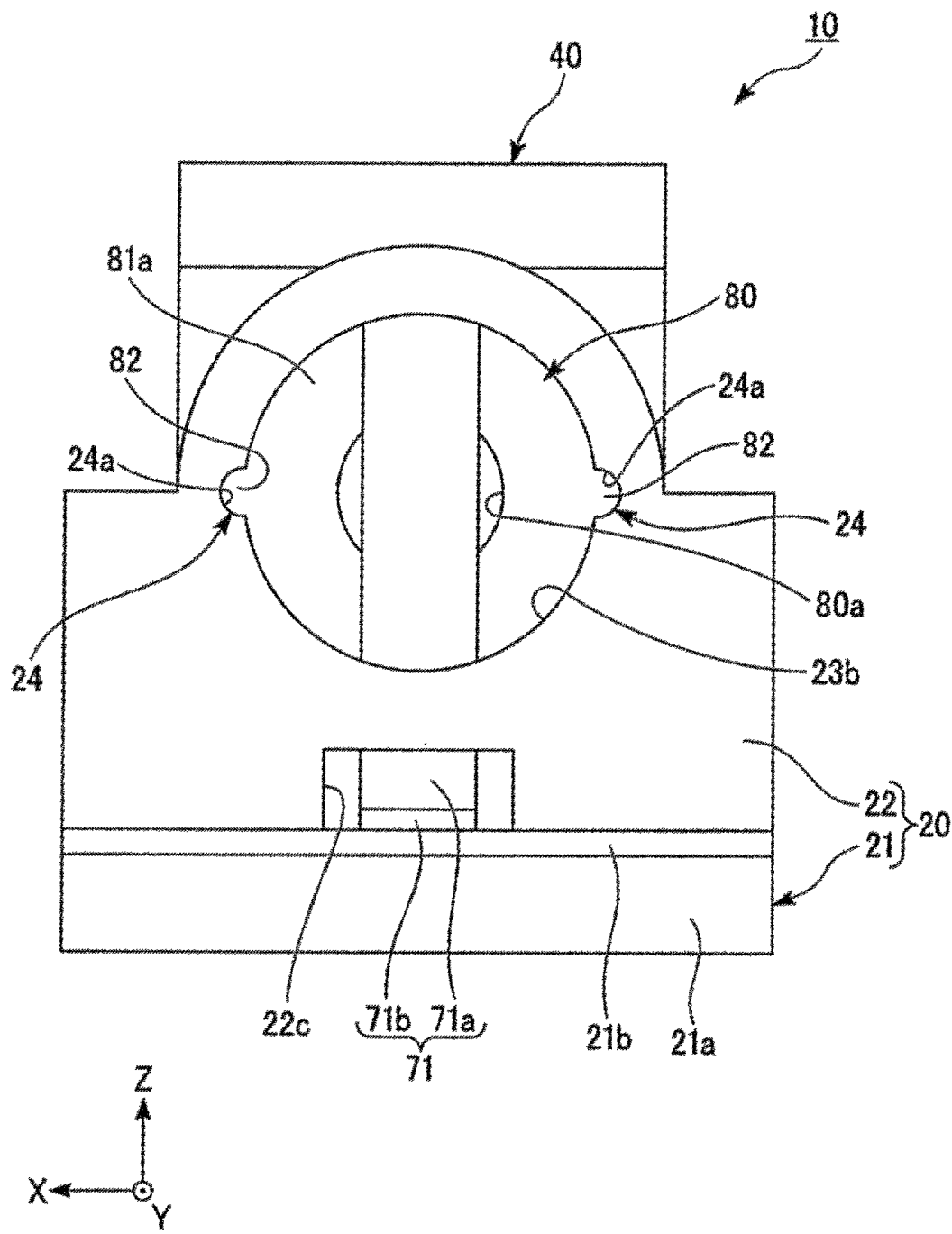
FIG. 4 is a view of the pressure control device shown in FIG. 1 as viewed from the front side.

As shown in FIG. 1, the spool hole 23 includes a groove part 24 that is recessed from the inner circumferential surface of the spool hole 23 toward the radial-direction outer side and extends in the axial direction Y. In the embodiment, a pair of groove parts 24 are provided across the central axis J. The pair of groove parts 24 are recessed from the inner circumferential surface of the guiding hole part 23b toward both sides in the left-right direction X. The groove part 24 is provided from the front-side end part on the inner circumferential surface of the guiding hole part 23b to the rear-side end part on the inner circumferential surface of the guiding hole part 23b. As shown in FIG. 4, an inner side surface 24a of the groove part 24 is in a semicircular arc shape that is concave from the inner circumferential surface of the guiding hole part 23b toward the radial-direction outer side when viewed from the front side.

As shown in FIG. 3, the upper body 22 includes through holes 22a, 22b, 22c at the front-side end part of the upper body 22. The through hole 22a penetrates a part in the upper body 22 from the upper surface of the upper body 22 to the inner circumferential surface of the guiding hole part 23b in the vertical direction Z. The through hole 22b penetrates a part in the upper body 22 from the lower surface of the upper body 22 to the inner circumferential surface of the guiding hole part 23b in the vertical direction Z. As shown in FIG. 1, the through hole 22a and the through hole 22b are in a rectangular shape that is long in the left-right direction X when viewed from the upper side. The through hole 22a and the through hole 22b overlap each other when viewed from the upper side.

As shown in FIG. 3, the through hole 22c penetrates a part in the upper body 22 from the front surface of the upper body 22 to the through hole 22b in the axial direction Y. The through hole 22c is provided at the lower end part of the front surface of the upper body 22. The through hole 22c opens on the lower side. As shown in FIG. 4, the through hole 22c is in a rectangular shape that is long in the left-right direction X when viewed from the front side. The centers of the through holes 22a, 22b, 22c in the left-right direction X are, for example, the same as the position of the central axis J in the left-right direction X.

As shown in FIG. 1, the part of the upper body 22 where the spool hole 23 is provided protrudes further to the upper side than the other part of the upper body 22. The upper surface at the front-side end part of this protruding part is a curved surface in a semicircular arc shape convex toward the upper side. The through hole 22a opens at the upper end part of the curved surface in a semicircular arc shape. The lower body main body 21a, the separate plate 21b, and the upper body 22 are each a single member, for example. The lower body main body 21a, the separate plate 21b, and the upper body 22 are made of a nonmagnetic material.

As shown in FIG. 3, the spool valve 30 is disposed along the central axis J extending in the axial direction Y that intersects the vertical direction Z. The spool valve 30 is in a circular columnar shape. The spool valve 30 is attached to the oil passage body 20. The spool valve 30 is disposed to be movable in the axial direction Y within the spool hole 23.

The spool valve 30 moves in the axial direction Y within the spool hole main body 23a, and opens and closes the opening part of the oil passage 10a that opens on the inner circumferential surface of the spool hole main body 23a. Though omitted in the drawings, a forward force from oil pressure of the oil or a driving device such as a solenoid actuator is applied to the rear-side end part of the spool valve 30. The spool valve 30 includes a supporting part 31a, a plurality of large diameter parts 31b, and a plurality of small diameter parts 31c. Each part of the spool valve 30 is in a circular columnar shape extending in the axial direction Y with the central axis J as the center.

The supporting part 31a is the front-side end part of the spool valve 30. The front-side end part of the supporting part 31a supports the rear-side end part of the magnet holder 80. The rear-side end part of the supporting part 31a is connected to the front-side end part of the large diameter part 31b.

The plurality of large diameter parts 31b and the plurality of small diameter parts 31c are alternately and continuously disposed from the large diameter part 31b connected to the rear-side end part of the supporting part 31a toward the rear side. The outer diameter of the large diameter part 31b is larger than the outer diameter of the small diameter part 31c. In the embodiment, the outer diameter of the supporting part 31a and the outer diameter of the small diameter part 31c are, for example, equal. The outer diameter of the large diameter part 31b is substantially equal to the inner diameter of the spool hole main body 23a, and is slightly smaller than the inner diameter of the spool hole main body 23a. The large diameter part 31b is movable in the axial direction Y while sliding with respect to the inner circumferential surface of the spool hole main body 23a. The large diameter part 31b functions as a valve part that opens and closes the opening part of the oil passage 10a that opens on the inner circumferential surface of the spool hole main body 23a. In the embodiment, the spool valve 30 is, for example, a single member made of metal.

The magnet holder 80 is disposed on the front side of the spool valve 30. The magnet holder 80 is disposed inside the guiding hole part 23b to be movable in the axial direction Y. The spool valve 30 and the magnet holder 80 are allowed to rotate relative to each other around the central axis. As shown in FIG. 2, the magnet holder 80 includes a holder main body part 81 and a facing part 82.

The holder main body part 81 is in a stepped circular columnar shape extending in the axial direction Y with the central axis J as the center. As shown in FIG. 3, the holder main body part 81 is disposed in the spool hole 23. More specifically, the holder main body part 81 is disposed in the guiding hole part 23b. The holder main body part 81 includes a sliding part 81a and a supported part 81b. That is, the magnet holder 80 includes the sliding part 81a and the supported part 81b.

The outer diameter of the sliding part 81a is larger than the outer diameter of the large diameter part 31b. The outer diameter of the sliding part 81a is substantially equal to the inner diameter of the guiding hole part 23b, and is slightly smaller than the inner diameter of the guiding hole part 23b. The sliding part 81a is movable in the axial direction Y while sliding with respect to the inner circumferential surface of the spool hole 23, that is, the inner circumferential surface of the guiding hole part 23b in the embodiment. The radial-direction outer edge part of the rear-side surface of the sliding part 81a can contact a front-side-facing step surface of a step formed between the spool hole main body 23a and the guiding hole part 23b. In this way, the magnet holder 80 can be suppressed from moving from the position where the magnet holder 80 contacts the step surface toward the rear side, and the furthest rear end position of the magnet holder 80 can be determined. As will be described later, since the spool valve 30 receives a backward force from the elastic member 70 via the magnet holder 80, the furthest rear end position of the spool valve 30 can be determined by determining the furthest rear end position of the magnet holder 80.

The supported part 81b is connected to the rear-side end part of the sliding part 81a. The outer diameter of the supported part 81b is smaller than the outer diameter of the sliding part 81a and the outer diameter of the large diameter part 31b, and larger than the outer diameter of the supporting part 31a and the outer diameter of the small diameter part 31c. The supported part 81b is movable in the spool hole main body 23a. The supported part 81b moves in the axial direction Y between the guiding hole part 23b and the spool hole main body 23a as the spool valve 30 moves in the axial direction Y.

The supported part 81b includes a supported concave part 80b that is recessed from the rear-side end part of the supported part 81b toward the front side. The supporting part 31a is inserted into the supported concave part 80b. The front-side end part of the supporting part 31a contacts the bottom surface of the supported concave part 80b. In this way, the magnet holder 80 is supported by the spool valve 30 from the rear side. The size of the supported part 81b in the axial direction Y is smaller than the size of the sliding part 81a in the axial direction Y, for example.

As shown in FIG. 2, the facing part 82 protrudes from the holder main body part 81 toward the radial-direction outer side. More specifically, the facing part 82 protrudes from the sliding part 81a toward the radial-direction outer side. In the embodiment, a pair of facing parts 82 are provided across the central axis J. The pair of facing parts 82 protrude from the outer circumferential surface of the sliding part 81a toward both sides in the left-right direction X. The facing part 82 extends in the axial direction Y from the front-side end part of the sliding part 81a to the rear-side end part of the sliding part 81a. As shown in FIG. 4, the facing part 82 is in a semicircular arc shape that is convex toward the radial-direction outer side when viewed from the front side.

The pair of facing parts 82 are fitted in the pair of groove parts 24. The facing part 82 faces the inner side surface 24a of the groove part 24 in the circumferential direction and can contact the inner side surface 24a. In addition, in the specification, that "two certain parts face each other in the circumferential direction" includes that both of the two parts are located on one virtual circle along the circumferential direction and that the two parts face each other.

As shown in FIG. 3, the magnet holder 80 includes a first concave part 81c that is recessed from the outer circumferential surface of the sliding part 81a toward the radial-direction inner side. In FIG. 3, the first concave part 81c is recessed from the upper end part of the sliding part 81a toward the lower side. The inner side surfaces of the first concave part 81c include a pair of surfaces facing the axial direction Y.

The magnet holder 80 includes a second concave part 80a that is recessed from the front-side end part of the magnet holder 80 toward the rear side. The second concave part 80a extends from the sliding part 81a to the supported part 81b. As shown in FIG. 2, the second concave part 80a is in a circular shape with the central axis J as the center when viewed from the front side. As shown in FIG. 3, the inner diameter of the second concave part 80a is larger than the inner diameter of the supported concave part 80b.

For example, the magnet holder 80 may be made of resin or made of metal. In the case where the magnet holder 80 is made of resin, the magnet holder 80 can be easily manufactured. Moreover, the manufacturing cost of the magnet holder 80 can be reduced. In the case where the magnet holder 80 is made of metal, the size accuracy of the magnet holder 80 can be improved.

As shown in FIG. 2, the magnet 50 is in a substantially rectangular parallelepiped shape. The upper surface of the magnet 50 is, for example, a surface that is curved in an arc shape along the circumferential direction. As shown in FIG. 3, the magnet 50 is accommodated in the first concave part 81c and fixed to the holder main body part 81. In this way, the magnet 50 is fixed to the magnet holder 80. The magnet 50 is fixed by, for example, an adhesive. The radial-direction outer side surface of the magnet 50 is located, for example, closer to the radial-direction inner side than the outer circumferential surface of the sliding part 81a. The radial-direction outer side surface of the magnet 50 faces the inner circumferential surface of the guiding hole part 23b in the radial direction with a gap therebetween.

As described above, the sliding part 81a provided with the first concave part 81c moves while sliding with respect to the inner circumferential surface of the spool hole 23. Therefore, the outer circumferential surface of the sliding part 81a and the inner circumferential surface of the spool hole 23 contact each other or face each other with a slight gap therebetween. As a result, it is difficult for foreign matters such as metal pieces contained in the oil to enter the first concave part 81c. Therefore, foreign matters such as metal pieces contained in the oil can be suppressed from attaching to the magnet 50 accommodated in the first concave part 81c. In the case where the magnet holder 80 is made of metal, since the size accuracy of the sliding part 81a can be improved, it is more difficult for the foreign matters such as metal pieces contained in the oil to enter the first concave part 81c.

As shown in FIG. 2, the fixing member 71 is in a plate shape whose plate surfaces are parallel to the left-right direction X. The fixing member 71 includes an extending part 71a and a bent part 71b. The extending part 71a extends in the vertical direction Z. The extending part 71a is in a rectangular shape that is long in the vertical direction Z when viewed from the front side. As shown in FIG. 1 and FIG. 3, the extending part 71a is inserted into the guiding hole part 23b through the through hole 22b. The upper end part of the extending part 71a is inserted into the through hole 22a. The extending part 71a closes a part of the opening of the guiding hole part 23b on the front side. The bent part 71b is bent from the lower-side end part of the extending part 71a toward the front side. The bent part 71b is inserted into the through hole 22c. The fixing member 71 is disposed on the front side of the elastic member 70.

In the embodiment, the fixing member 71 is inserted to the through hole 22a from the opening part of the through hole 22b, which opens on the lower surface of the upper body 22, through the through hole 22b and the guiding hole part 23b before the upper body 22 and the lower body 21 are overlapped. Then, as shown in FIG. 1, the upper body 22 and the lower body 21 are stacked and combined in the vertical direction Z, whereby the bent part 71b inserted in the through hole 22c can be supported by the upper surface of the lower body 21 from the lower side. In this way, the fixing member 71 can be attached to the oil passage body 20.

As shown in FIG. 3, the elastic member 70 is a coil spring extending in the axial direction Y. The elastic member 70 is disposed on the front side of the magnet holder 80. In the embodiment, at least a part of the elastic member 70 is disposed in the second concave part 80a. Therefore, at least a part of the elastic member 70 can be overlapped with the magnet holder 80 in the radial direction, and the size of the pressure control device 10 in the axial direction Y can be easily reduced. In the embodiment, the rear-side part of the elastic member 70 is disposed in the second concave part 80a.

The rear-side end part of the elastic member 70 contacts the bottom surface of the second concave part 80a. The front-side end part of the elastic member 70 contacts the fixing member 71. In this way, the front-side end part of the elastic member 70 is supported by the fixing member 71. The fixing member 71 receives a forward elastic force from the elastic member 70, and the extending part 71a is pressed against the front-side inner side surfaces of the through holes 22a, 22b.

By supporting the front-side end part of the elastic member 70 by the fixing member 71, the elastic member 70 applies a backward elastic force to the spool valve 30 via the magnet holder 80. Therefore, for example, the position of the spool valve 30 in the axial direction Y can be maintained at a position where the oil pressure of the oil or the force from a driving device such as a solenoid actuator applied to rear-side end part of the spool valve 30 and the elastic force of the elastic member 70 are balanced. In this way, the position of the spool valve 30 in the axial direction Y can be changed by changing the force applied to the rear-side end part of the spool valve 30, and the oil passage 10a inside the oil passage body 20 can be switched between opening and closing.

Further, the magnet holder 80 and the spool valve 30 can be pressed against each other in the axial direction Y by the oil pressure of the oil or the force from a driving device such as a solenoid actuator applied to rear-side end part of the spool valve 30 and the elastic force of the elastic member 70. Therefore, the magnet holder 80 moves in the axial direction Y as the spool valve 30 moves in the axial direction Y while relative rotation around the central axis with respect to the spool valve 30 is allowed.

The sensor module 40 includes a housing 42 and a magnetic sensor 41. The housing 42 accommodates the magnetic sensor 41. As shown in FIG. 1, the housing 42 is, for example, in a rectangular parallelepiped box shape flat in the vertical direction Z. The housing 42 is fixed to a flat surface located on the rear side of the curved surface in a semicircular arc shape, where the through hole 22a is provided, on the upper surface of the upper body 22.

As shown in FIG. 3, the magnetic sensor 41 is fixed to the bottom surface of the housing 42 inside the housing 42. In this way, the magnetic sensor 41 is attached to the oil passage body 20 via the housing 42. The magnetic sensor 41 detects the magnetic field of the magnet 50. The magnetic sensor 41 is, for example, a Hall element. Further, the magnetic sensor 41 may be a magnetoresistive element.

When the position of the magnet 50 in the axial direction Y changes as the spool valve 30 moves in the axial direction Y, the magnetic field of the magnet 50 passing through the magnetic sensor 41 changes. Therefore, by detecting the change in the magnetic field of the magnet 50 by the magnetic sensor 41, the position of the magnet 50 in the axial direction Y (that is, the position of the magnet holder 80 in the axial direction Y) can be detected. As described above, the magnet holder 80 moves in the axial direction Y as the spool valve 30 moves in the axial direction Y. Therefore, the position of the spool valve 30 in the axial direction Y can be detected by detecting the position of the magnet holder 80 in the axial direction Y.

The magnetic sensor 41 and the magnet 50 overlap in the vertical direction Z. That is, at least a part of the magnet 50 overlaps the magnetic sensor 41 in a direction parallel to the vertical direction Z in the radial direction. Therefore, the magnetic sensor 41 can easily detect the magnetic field of the magnet 50. As a result, the sensor module 40 can detect the position change of the magnet holder 80 in the axial direction Y (that is, the position change of the spool valve 30 in the axial direction Y) with higher accuracy.

In addition, in the specification, that "at least a part of the magnet overlaps the magnetic sensor in the radial direction" means that at least a part of the magnet may overlap the magnetic sensor in the radial direction in at least some positions within the range in which the spool valve to which the magnet is directly fixed moves in the axial direction. That is, for example, when the spool valve 30 and the magnet holder 80 change the positions in the axial direction Y from the positions of FIG. 3, the magnet 50 may not overlap the magnetic sensor 41 in the vertical direction Z. In the embodiment, a part of the magnet 50 overlaps the magnetic sensor 41 in the vertical direction Z at any position as long as the spool valve 30 is within the range in which the spool valve 30 moves in the axial direction Y.

The pressure control device 10 further includes a rotation stopping part. The rotation stopping part is a part that can contact the magnet holder 80. In the embodiment, the rotation stopping part is the inner side surface 24a of the groove part 24. That is, the facing part 82 faces the inner side surface 24a, which is the rotation stopping part, in the circumferential direction and can contact the inner side surface 24a.

Therefore, according to the embodiment, for example, when the facing part 82 tries to rotate around the central axis J, the facing part 82 contacts the inner side surface 24a, which is the rotation stopping part. As a result, rotation of the facing part 82 is suppressed by the inner side surface 24a, and rotation of the magnet holder 80 around the central axis J is suppressed. As a result, the position of the magnet 50 fixed to the magnet holder 80 can be suppressed from shifting in the circumferential direction. Therefore, even when the spool valve 30 rotates around the central axis J when the position of the spool valve 30 in the axial direction Y does not change, the information of the position of the magnet 50 in the axial direction Y detected by the magnetic sensor 41 can be suppressed from changing. In this way, the information of the position of the spool valve 30 can be suppressed from changing, and the accuracy of grasping the position of the spool valve 30 in the axial direction Y can be improved.

Further, according to the embodiment, the rotation stopping part is the inner side surface 24a of the groove part 24. Therefore, it is not necessary to prepare a separate member as the rotation stopping part, and the number of components of the pressure control device 10 can be reduced. In this way, the effort required for the assembly of the pressure control device 10 and the manufacturing cost of the pressure control device 10 can be reduced.

As described above, the oil passing through the pressure control device 10 may contain foreign matters such as metal pieces. It is preferable that such foreign matters are captured in the course of the oil passing through the pressure control device 10 and are prevented from flowing further to the downstream side. Therefore, the pressure control device 10 is configured to be capable of capturing foreign matters. Hereinafter, this configuration and operation will be described with reference to FIG. 5 to FIG. 7.

In addition, though the pressure control device 10 is applied to an oil pressure control device which controls the pressure of oil in the embodiment, it is not limited thereto. Examples of devices to which the pressure control device 10 can be applied include fluid devices such as a water pressure control device that controls the pressure of water and an air pressure control device that controls the pressure of air in addition to an oil pressure control device. In this case, things that pass through the pressure control device 10 include fluids such as oil, water, and air, and these are collectively referred to as a "fluid" in the following description. Further, the direction in which the fluid flows is referred to as a "flow direction Q."

Figure 5:
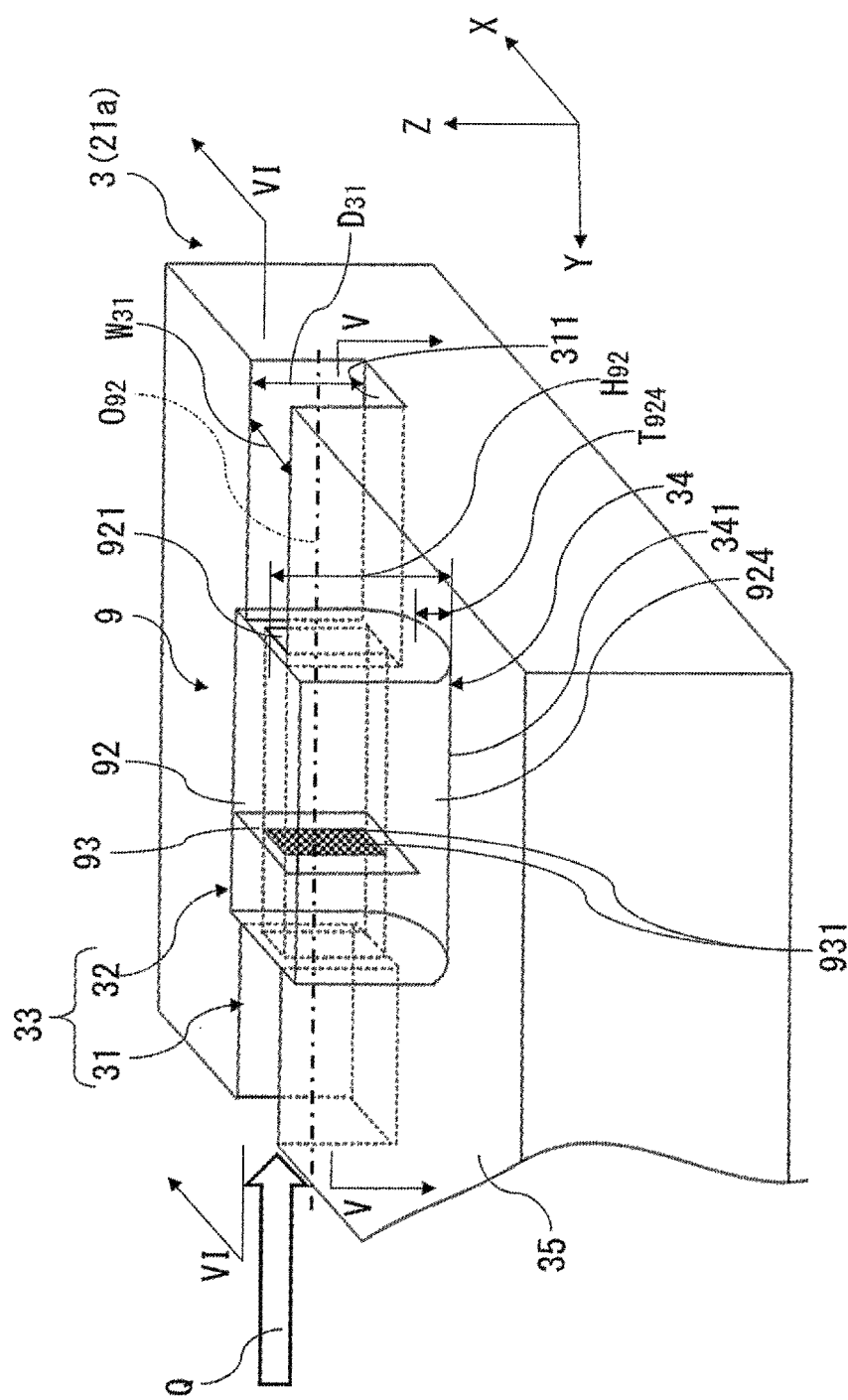
FIG. 5 is a longitudinal sectional perspective view showing a part of the pressure control device shown in FIG. 1.

In addition to the spool valve 30, the magnet holder 80, the magnet 50, the elastic member 70, the fixing member 71, the sensor module 40 and the like described above, the pressure control device 10 further includes a filter unit 9 attached to a body 3 as shown in FIG. 5.

Figure 6:
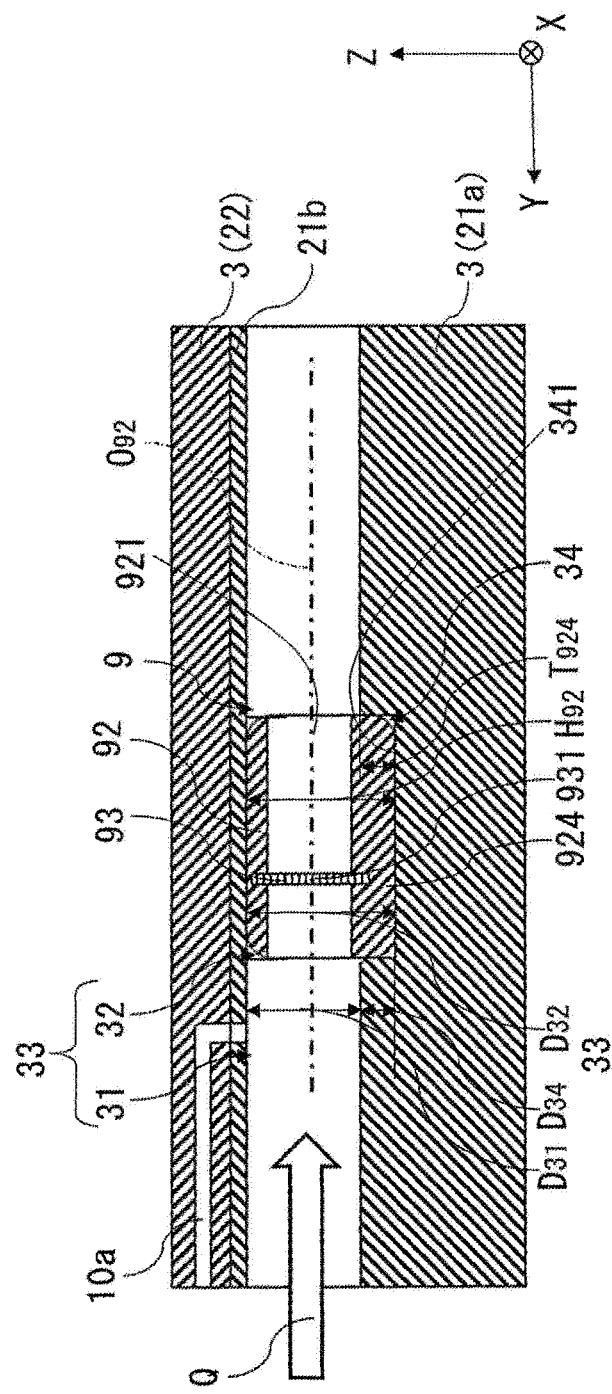
FIG. 6 is a cross-sectional view taken along the line VI-VI in FIG. 5.
Figure 7:
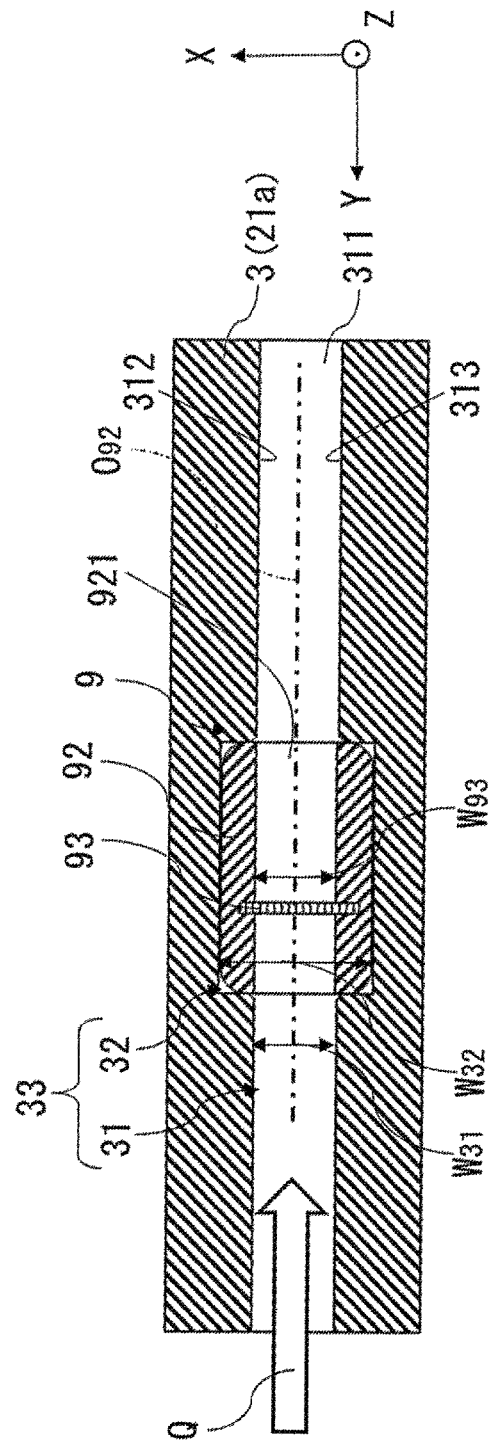
FIG. 7 is a cross-sectional view taken along the line V-V in FIG. 5.

The body 3 may be at least one of the lower body 21 and the upper body 22 that form the oil passage body 20. As shown in FIG. 5 to FIG. 7, the body 3 includes a groove-shaped flow path 33 which is provided in a recessed manner on an upper surface (surface) 35 and through which the fluid passes along the flow direction Q. The groove-shaped flow path 33 includes a groove part 31 and a widened part 32 connected to the groove part 31, and the groove-shaped flow path 33 forms a part of the oil passage 10a.

The groove part 31 includes a bottom part (first bottom part) 311 and, when viewed from upstream to downstream of the flow of the fluid, a side wall part 312 located on one side of the bottom part 311 and a side wall part 313 located on the other side of the bottom part 311. In addition, a boundary part between the bottom part 311 and the side wall part 312 and a boundary part between the bottom part 311 and the side wall part 313 may be rounded. In this case, the fluid can smoothly pass through the vicinity of these boundary parts.

The groove part 31 is in a linear shape along the axial direction Y in the plan view of the body 3, but it is not limited thereto, and the groove part 31 may include at least a part that is curved. A width (first width) $W_{31}$ (with reference to FIG. 7) of the groove part 31, which is the distance between the side wall part 312 and the side wall part 313, is substantially constant along the axial direction Y. Further, a depth (first depth) $D_{31}$ (with reference to FIG. 6) of the groove part 31, which is the depth from the surface 35 to the bottom part 311, is also substantially constant along the axial direction Y.

The widened part 32 is provided in the longitudinal direction of the groove-shaped flow path 33, that is, in the middle in the axial direction Y. The widened part 32 extends from the surface 35 to the bottom part 311, has a width larger than the width $W_{31}$ of the groove part 31, and functions as an accommodating part in which the filter unit 9 in a cylindrical shape is accommodated. A width $W_{32}$ (with reference to FIG. 7) of the widened part 32 is also substantially constant along the axial direction Y. That is, in the embodiment, the widened part 32 is in a rectangular shape wider than the groove part 31 in the plan view.

The widened part 32 in such a shape can be formed at the same time when the body 3 is manufactured by casting, for example.

As shown in FIG. 6, the widened part 32 has a depth (second depth) $D_{32}$ from the surface 35 to a bottom surface (second bottom part) 341 while maintaining the width $W_{32}$ constant along the vertical direction Z, and the depth $D_{32}$ is larger than the depth $D_{31}$ of the groove part 31. The widened part 32 includes, on the bottom part thereof, a receiving part 34 which a part of the filter unit 9 on the lower side enters. Of course, a depth $D_{34}$ of the receiving part 34 is equal to the difference between the depth $D_{32}$ and the depth $D_{31}$.

As shown in FIG. 5 to FIG. 7, the filter unit 9 is accommodated in the widened part 32 so that the direction orthogonal to a central axis $O_{92}$ of a frame body 92 is along the direction of the depth $D_{32}$ of the widened part 32 (that is, the vertical direction Z). The filter unit 9 can capture the foreign matters mixed in the fluid when the fluid passes through the groove-shaped flow path 33. In this way, for example, the malfunction of operation of the pressure control device 10 caused by foreign matters can be prevented or suppressed. Examples of the malfunction include inhibition of movement of the spool valve 30 when it moves in the spool hole 23.

The filter unit 9 includes the frame body 92 in a circular cylindrical shape and a filter member 93 in a planar plate shape disposed inside the frame body 92.

The filter member 93 is disposed along a direction orthogonal to the central axis $O_{92}$ of the frame body 92, and its thickness direction is parallel to the axial direction Y. In this way, the filter member 93 can face the fluid passing through the groove-shaped flow path 33.

The filter member 93 includes a plurality of small holes 931 penetrating in its thickness direction. The small holes 931 are disposed at intervals along both the left-right direction X and the vertical direction Z. Further, the size of each small hole 931 is large to the extent that it prevents passage of foreign matters without inhibiting the flow of the fluid. The diameter of the small hole 931 is set to be smaller than an average foreign matter diameter, and it is preferable that the total area of the small holes 931 is as large as possible so as not to inhibit the flow of the fluid, and it is also preferable that the opening ratio is as large as possible. With such small holes 931, the foreign matter capturing property of the filter unit 9 is improved. Further, the filter member 93 may be a member having a mesh region formed by a mesh. In this case, the mesh opening is set to the same extent as described above.

Further, the filter member 93 is supported inside the frame body 92. In this way, when the fluid passes through the filter member 93, the filter member 93 is prevented from being deformed by the flow of the fluid, whereby the filter member 93 can reliably capture the foreign matters. As a result, the foreign matter capturing property of the filter unit 9 is further improved.

As shown in FIG. 7, a width $W_{93}$ of the filter member 93 is equal to the width $W_{31}$ of the groove part 31 located further to the upstream side than the widened part 32. In this way, when the fluid passes through the filter member 93, it is possible to ensure as wide a capture area as possible for the filter member 93 to capture the foreign matters, whereby the foreign matter capturing property of the filter unit 9 is further improved. In addition, the width $W_{93}$ is equal to the width $W_{31}$ in the embodiment, but it is not limited thereto, and the width $W_{93}$ may be larger than the width $W_{31}$, for example.

As shown in FIG. 6, the frame body 92 is in a cylindrical shape and includes a through hole part 921 that penetrates in parallel with the central axis $O_{92}$.

Further, the filter member 93 is disposed to intercept the through hole part 921 and is supported inside the frame body 92. In this way, the filter member 93 and the frame body 92 are unitized and formed as one component, that is, the filter unit 9. Here, the inside of the frame body 92 refers to the side facing the through hole part 921, and the outside of the frame body 92 refers to the side facing the body 3 and the separate plate 21b.

When the body 3 and the filter unit 9 are assembled, the assembly can be performed by simple work of inserting the filter unit 9 into the widened part 32. Further, as described above, the widened part 32 is wider than the groove part 31. Therefore, the filter unit 9 can be easily inserted into the widened part 32 regardless of the width $W_{31}$ of the groove part 31, whereby the workability when the body 3 and the filter unit 9 are assembled is improved.

As shown in FIG. 6 and FIG. 7, the corner parts of the frame body 92 are chamfered (rounded). In this way, when the body 3 and the filter unit 9 are assembled, the filter unit 9 can be prevented from being hooked on the circumferential edge part of the widened part 32 and can be smoothly inserted.

As shown in FIG. 5, the frame body 92 (the filter unit 9) has a height $H_{92}$ that does not protrude from the groove-shaped flow path 33 toward the upper side in a state of being accommodated in the widened part 32. Further, the height $H_{92}$ is substantially equal to the depth $D_{32}$. In this way, when another member is to be further placed and assembled on the upper side with respect to the body 3 and the filter unit 9 in the assembly state, the assembly of another member is easy since the frame body 92 does not protrude from the groove-shaped flow path 33.

Further, the frame body 92 includes a protruding part 924 that protrudes toward the lower side thereof. In the state where the filter unit 9 is accommodated in the widened part 32, a lower-side part (a part) of the filter unit 9 (that is, the protruding part 924) can enter the receiving part 34.

Further, a lower surface 924a of the protruding part 924 (the end surface of the central axis $O_{92}$ of the frame body 92) is a curved surface having a circular arc-shaped cross section, and the bottom surface 341 of the receiving part 34 of the widened part 32 is also a curved surface corresponding to the lower surface 924a. In this way, a sufficient contact area between the lower surface 924a and the bottom surface 341 is ensured, and the posture of the filter unit 9 in the widened part 32 is stabilized, whereby the foreign matters can be captured more stably.

As described above, the pressure control device 10 is configured so that the protruding part 924 of the filter unit 9 enters the receiving part 34 of the widened part 32. In other words, in the pressure control device 10, a step 331 is formed between (in a boundary of) the bottom part 311 of the groove part 31 and the bottom surface 341 of the receiving part 34, and the protruding part 924 is disposed so as to eliminate the step 331. In this way, it is substantially difficult for the fluid to generate a flow detouring between the protruding part 924 and the receiving part 34, whereby the foreign matters can be prevented from bypassing the filter unit 9 and flowing to the downstream side. In addition, in a case where the frame body 92 is formed by a rubber material (elastic material), the protruding part 924 can be closely attached to the receiving part 34 due to elastic deformation.

A thickness $T_{924}$ of the protruding part 924 is substantially equal to the depth $D_{34}$ of the receiving part 34. In this way, it is difficult to form a step between the bottom part 311 of the groove part 31 and the protruding part 924, whereby the fluid can pass through the filter unit 9 smoothly. In addition, since the fluid can pass smoothly, it is even more difficult for the fluid to generate a flow detouring between the protruding part 924 and the receiving part 34. In this way, the foreign matters can be further reliably prevented from bypassing the filter unit 9 and flowing to the downstream side.

In addition, as shown in FIG. 5, since both the filter unit 9 (the frame body 92) and the widened part 32 are in a rectangular shape in the plan view, the filter unit 9 is prevented from rotating with the vertical direction Z as the center. That is, the disposition direction of the filter unit 9 with respect to the groove-shaped flow path 33 is regulated. Therefore, the corner parts of the widened part 32 can be said to configure a rotation preventing part that prevents the filter unit 9 from rotating with the vertical direction Z as the center.

Further, the filter unit 9 may include a detachment preventing part that prevents detachment from the widened part 32 after being inserted into the widened part 32. For example, the detachment preventing part can be configured by a pair of flat protruding parts that are provided on the upper part of the frame body 92 to protrude toward the outer side and have a flat shape. Specifically, one of the flat protruding parts can protrude to the left side in the left-right direction X, and the other of the flat protruding parts can protrude to the right side in the left-right direction X. Then, in the state where the filter unit 9 is accommodated in the widened part 32, each flat protruding part is pressed against the widened part 32 in its protruding direction. In this way, the filter unit 9 can be prevented from being detached from the widened part 32. Due to this detachment prevention effect, for example, even if the body 3 and the filter unit 9 in the assembly state are turned upside down, or even if vibration is applied during transportation, unintentional disassembly of the body 3 and the filter unit 9 when the filter unit 9 is detached from the widened part 32 can be prevented.

In the filter unit 9 with the above configuration, for example, it is preferable that the frame body 92 is made of resin or rubber and that the filter member 93 is made of metal. In this way, the filter unit 9 can be an insert-molded product of the frame body 92 and the filter member 93. Therefore, high efficiency at the time of manufacturing the filter unit 9 can be achieved. In particular, the filter unit 9 is easy to mold because the frame body 92 is in a circular cylindrical shape.

Figure 8:
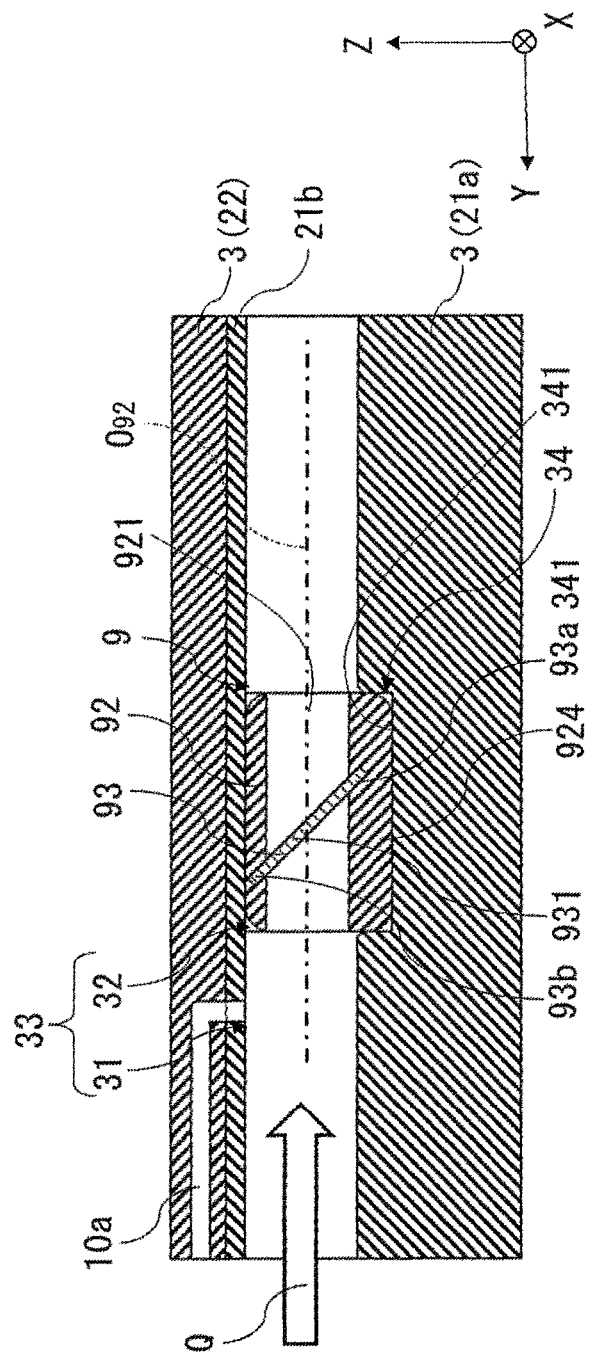
FIG. 8 is a cross-sectional view showing the filter unit provided in the pressure control device (the second embodiment) of the disclosure.

Hereinafter, a second embodiment of the pressure control device of the disclosure will be described with reference to FIG. 8, but the description will focus on differences from the above-described embodiment, and the description of the same matters will be omitted.

This embodiment is the same as the above first embodiment except that the disposition direction of the filter member 93 is different.

The filter member 93 includes a lower end part (a first end part) 93a on the bottom surface 341 side of the widened part 32 (the receiving part 34) and an upper end part (a second end part) 93b on a side opposite to the lower end part 93a across the central axis $O_{92}$ of the frame body 92. In the embodiment, as shown in FIG. 8, the filter member 93 is inclined with respect to the central axis $O_{92}$ of the frame body 92 with the lower end part (the first end part) 93a located on the downstream side of the groove-shaped flow path 33 and the upper end part 93b located on the upstream side of the groove-shaped flow path 33.

With this configuration, the contact area of the filter member 93 with the fluid can be increased, and the foreign matter capturing property of the filter member 93 can be further improved.

Further, if the filter member 93 is disposed so that the lower end part 93a is located on the downstream side of the groove-shaped flow path 33 and the upper end part 93b is located on the upstream side of the groove-shaped flow path 33, the foreign matters captured by the filter member 93 can be made easy to fall toward the bottom surface side of the groove-shaped flow path 33. Therefore, it is difficult for the filter member 93 to be clogged.

In addition, according to the needs, the filter member 93 may be disposed so that the lower end part 93a is located on the upstream side of the groove-shaped flow path 33 and the upper end part 93b is located on the downstream side of the groove-shaped flow path 33.

Hereinafter, a third embodiment of the pressure control device of the disclosure will be described with reference to FIG. 9, but the description will focus on differences from the above-described embodiments, and the description of the same matters will be omitted.

This embodiment is the same as the above first embodiment except that the disposition number of the filter member 93 is different.

Figure 9:
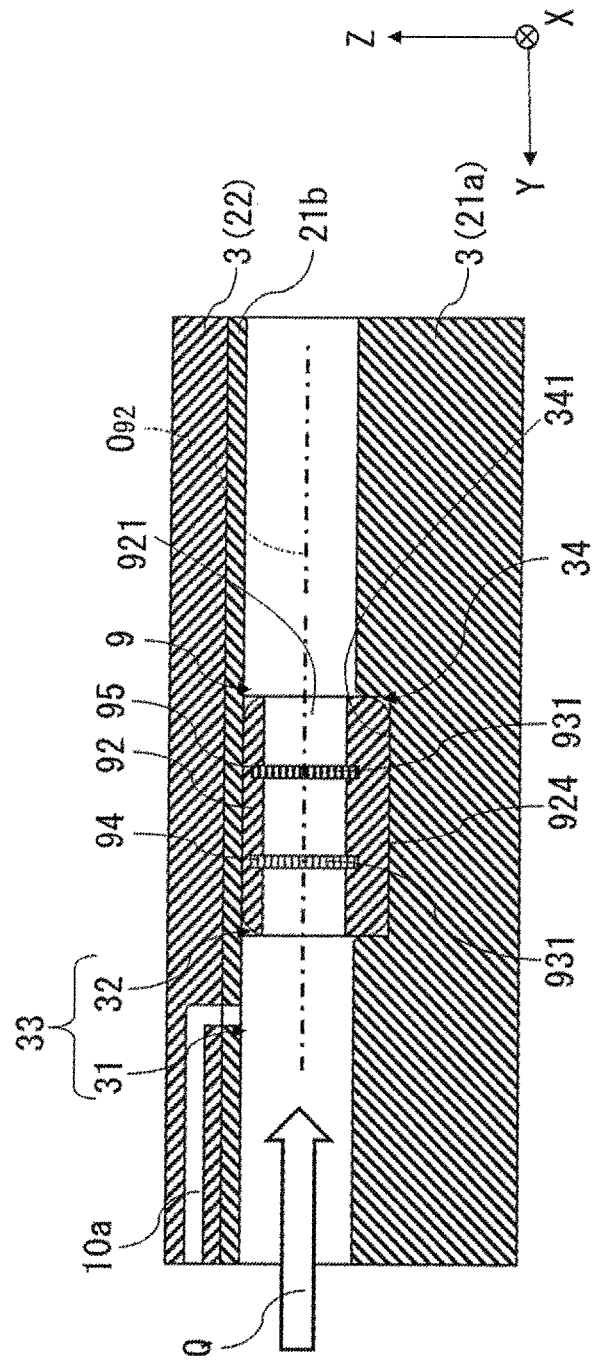
FIG. 9 is a cross-sectional view showing the filter unit provided in the pressure control device (the third embodiment) of the disclosure.

The filter unit 9 shown in FIG. 9 includes two filter members 94, 95, which are disposed along the central axis $O_{92}$ of the frame body 92. Specifically, the filter member 94 is disposed on the upstream side of the groove-shaped flow path 33, and the filter member 95 is disposed on the downstream side of the groove-shaped flow path 33. By the two filter members 94, 95 provided, the foreign matter capturing property of the filter unit 9 can be further improved.

Further, it is preferable that the size of the small holes 931 formed in the filter member 94 disposed on the upstream side of the groove-shaped flow path 33 is larger than the size of the small holes 931 formed in the filter member 95 disposed on the downstream side of the groove-shaped flow path 33. With this configuration, the foreign matter capturing property of the filter unit 9 can be sufficiently improved while the filter members 94, 95 can be prevented from being clogged.

In addition, three or more filter members may be disposed along the central axis $O_{92}$ of the frame body 92. Further, in a case where a plurality of filter members are disposed, one or two or more of the filter members may be disposed to be inclined with respect to the central axis $O_{92}$ of the frame body 92.

Hereinafter, a fourth embodiment of the pressure control device of the disclosure will be described with reference to FIG. 10 and FIG. 11, but the description will focus on differences from the above-described embodiments, and the description of the same matters will be omitted.

This embodiment is the same as the above second embodiment except that the configurations (shapes) of the frame body 92 and the widened part 32 are different.

Figure 10:
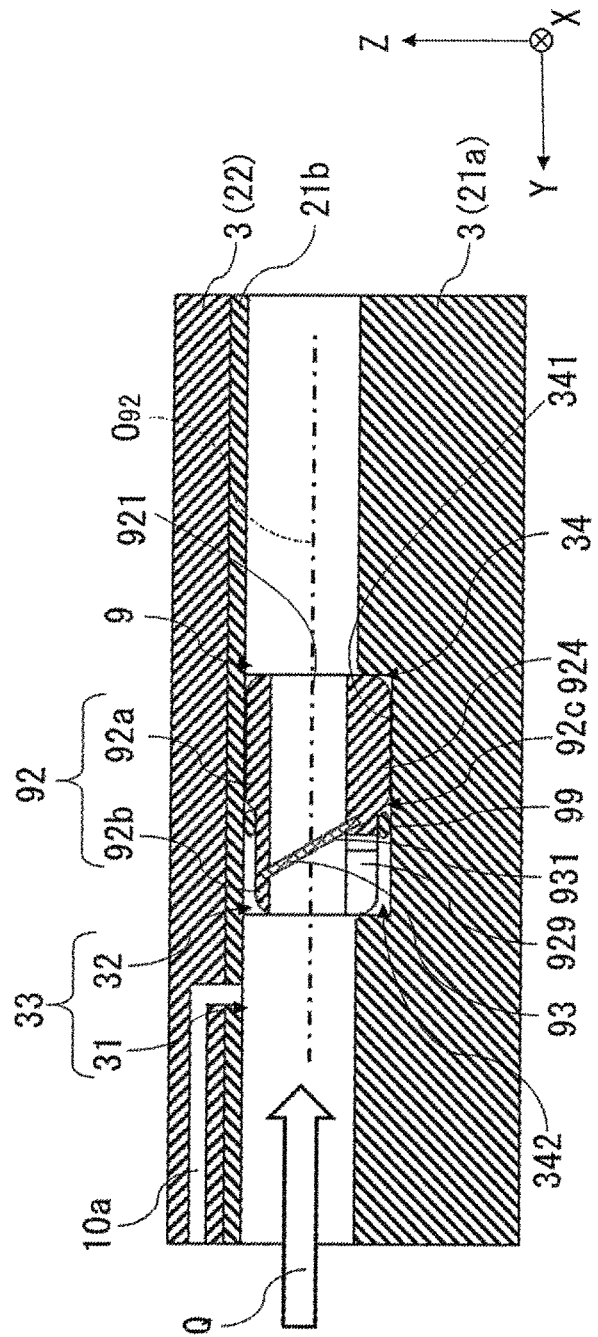
FIG. 10 is a cross-sectional view showing the filter unit provided in the pressure control device (the fourth embodiment) of the disclosure.
Figure 11:
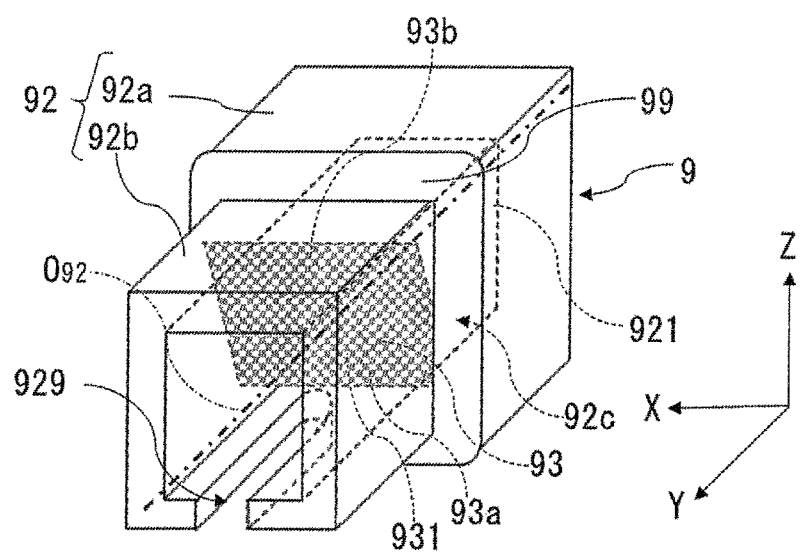
FIG. 11 is a perspective view of the filter unit shown in FIG. 10.

The frame body 92 shown in FIG. 10 and FIG. 11 is in a rectangular cylindrical shape as a whole, and the bottom surface 341 of the widened part 32 (the receiving part 34) is formed as a flat surface correspondingly. In addition, in FIG. 11, that the corner parts of the frame body 92 are chamfered (rounded) is omitted in the drawing.

Further, the frame body 92 has a cross-sectional shape along the central axis $O_{92}$ (that is, a shape of a cross-sectional surface (a cross section cut into a ring) orthogonal to the central axis $O_{92}$) that changes in the middle in the direction along the central axis $O_{92}$. Specifically, the frame body 92 of the embodiment includes a first part 92a whose outer side shape (profile) in its cross section and viewed from the central axis $O_{92}$ has a first contour in a rectangular shape, and a second part 92b whose outer side shape (profile) viewed from the central axis $O_{92}$ has a second contour in a rectangular shape smaller than the first contour. In this way, a step part 92c is located at a boundary part between the first part 92a and the second part 92b along the outer-side circumferential edge part of the frame body 92 when viewed from the through hole part 921.

Further, the filter unit 9 of the embodiment includes a seal member 99 in a rectangular ring shape disposed along the outer-side circumferential edge part of the frame body 92 when viewed from the through hole part 921. The seal member 99 is hooked on (in contact with) the step part 92c of the frame body 92, whereby the movement of the frame body 92 in the direction along the central axis $O_{92}$ is restricted. That is, the step part 92c functions as a fixing part that fixes the seal member 99 to the frame body 92.

In addition, the fixing part may be configured by a groove disposed along the outer-side circumferential edge part of the frame body 92 when viewed from the through hole part 921 as long as the seal member 99 can be fixed to the frame body 92. In this case, the first contour and the second contour can be made substantially the same.

When the filter unit 9 with such a configuration is accommodated in the widened part 32 and the separate plate 21b is attached to the body 3 so as to cover the groove-shaped flow path 33, the seal member 99 elastically deforms, and two side parts thereof are closely attached to the inner wall surfaces of the widened part 32, the lower part thereof is closely attached to the bottom surface 341 of the widened part 32, and the upper part thereof is closely attached to the lower surface of the separate plate 21b. Therefore, it is difficult for a gap to be formed between the frame body 92 and the widened part 32, whereby the flow of the fluid can be prevented from detouring outside the filter unit 9.

Further, the outer-side circumferential edge part of the second part 92b when viewed from the through hole part 921 functions as a deformation absorbing part that absorbs deformation when the seal member 99 elastically deforms. Therefore, the filter unit 9 can be reliably accommodated in the widened part 32.

Further, a notch 929 is formed on the frame body 92 (the second part 92b) on the bottom surface side of the groove-shaped flow path 33. The notch 929 functions as storage part that stores the foreign matters captured by the filter member 93.

In the embodiment, the frame body 92 is disposed with the first part 92a located on the downstream side of the groove-shaped flow path 33 and the second part 92b located on the upstream side of the groove-shaped flow path 33. Therefore, the notch 929 is disposed further to the upstream side of the groove-shaped flow path 33 than the filter member 93. With this disposition, the foreign matter storage efficiency can be further improved.

The notch 929 is a through hole that penetrates the frame body 92 (the second part 92b) in the thickness direction and is open at the end part of the frame body 92 on the upstream side of the groove-shaped flow path 33.

As described above, in the embodiment, the second part 92b of the frame body 92 is disposed on the upstream side of the groove-shaped flow path 33, whereby a space 342 is formed between the second part 92b and the bottom surface 341 of the widened part 32. Therefore, this space 342 can also be effectively used as a part of the storage part. With such a configuration, the captured foreign matters can be prevented from being taken into the fluid that passes through the through hole part 921 again.

Specifically, since the notch 929 is open at the end part of the frame body 92 on the upstream side of the groove-shaped flow path 33, the foreign matters moving along the bottom surface of the groove-shaped flow path 33 can be easily taken in.

In addition, in the embodiment, as shown in FIG. 11, since the filter member 93 is disposed to be inclined with respect to the central axis $O_{92}$ of the frame body 92 with the lower end part 93a located on the downstream side of the groove-shaped flow path 33 and the upper end part 93b located on the upstream side of the groove-shaped flow path 33, the foreign matter storage effect can be further improved.

Further, the storage part may be configured by a through hole that is not open at the end part of the frame body 92 on the upstream side of the groove-shaped flow path 33, or may be configured by a concave part having a bottom that does not penetrate the frame body 92 in the thickness direction.

Moreover, the frame body 92 may be disposed with the second part 92b located on the downstream side of the groove-shaped flow path 33 and the first part 92a located on the upstream side of the groove-shaped flow path 33. In this case, it is preferable that a notch (a storage part) is formed on the first part 92a on the bottom surface side of the groove-shaped flow path 33.

Although the pressure control device of the disclosure has been described above with the embodiments of the drawings, the disclosure is not limited thereto. Each part which configures the pressure control device can be replaced with any configuration which can exhibit the same function. Moreover, any component may be added.

Further, the pressure control device of the disclosure may be a combination of any two or more configurations (features) of the above embodiments.

For example, the filter member may be disposed to be curved in an arch shape or may be disposed to be bent in a dogleg shape.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A pressure control device comprising:
an oil passage body that includes therein an oil passage through which oil flows;
a spool valve that is attached to the oil passage body;
a body that is at least one of a lower body and an upper body that constructs the oil passage body, and the body comprises a groove-shaped flow path, and the groove-shaped flow path comprising:
a groove part; and
a widened part, connected to the groove part and having a width larger than a width of the groove part;
a separate plate that covers the groove-shaped flow path; and
a filter unit which captures foreign matters mixed in a fluid which passes through the groove-shaped flow path, wherein the filter unit comprises:
a frame body, being in a cylindrical shape and comprising a through hole part which penetrates in a direction along a central axis of the frame body; and
at least one filter member, being in a planar plate shape, and being disposed to intercept the through hole part and supported inside the frame body,
wherein an upper part of the frame body faces a lower surface of the separate plate,
wherein the filter unit is accommodated in the widened part so that a direction orthogonal to the central axis of the frame body is along a depth direction of the widened part.

2. The pressure control device according to claim 1, wherein the frame body comprises:
a storage part which is provided on a bottom surface side of the groove-shaped flow path and which stores the foreign matters that have been captured.

3. The pressure control device according to claim 2, wherein
the storage part is disposed further to an upstream side of the groove-shaped flow path than the filter member.

4. The pressure control device according to claim 3, wherein
the storage part penetrates the frame body in a thickness direction.

5. The pressure control device according to claim 3, wherein
the storage part is open at an end part of the frame body on the upstream side of the groove-shaped flow path.

6. The pressure control device according to claim 1, wherein
the filter member is inclined with respect to the central axis of the frame body.

7. The pressure control device according to claim 6, wherein the filter member is inclined with respect to the central axis of the frame body with a first end part on a bottom surface side of the widened part located on a downstream side of the groove-shaped flow path and with a second end part on a side opposite to the first end part across the central axis of the frame body located on an upstream side of the groove-shaped flow path.

8. The pressure control device according to claim 1, wherein
the at least one filter member comprises a plurality of the filter members disposed along the central axis of the frame body.

9. The pressure control device according to claim 8, wherein
a size of small holes formed in the filter member disposed on an upstream side of the groove-shaped flow path is larger than a size of small holes formed in the filter member disposed on a downstream side of the groove-shaped flow path.

10. The pressure control device according to claim 1, wherein
the filter unit further comprises a seal member in a ring shape disposed along an outer-side circumferential edge part of the frame body when viewed from the through hole part.

11. The pressure control device according to claim 10, wherein the frame body comprises:
a fixing part which is disposed along the outer-side circumferential edge part when viewed from the through hole part and which fixes the seal member.

12. The pressure control device according to claim 11, wherein the frame body comprises:
a first part whose outer side shape in a cross section along the central axis and viewed from the central axis has a first contour;
a second part whose outer side shape in a cross section along the central axis and viewed from the central axis has a second contour smaller than the first contour; and
a step part which is located at a boundary part between the first part and the second part and which functions as the fixing part.

13. The pressure control device according to claim 12, wherein
the frame body is disposed so that the first part is located on a downstream side of the groove-shaped flow path and the second part is located on an upstream side of the groove-shaped flow path.

14. The pressure control device according to claim 1, wherein
the filter unit is an insert-molded product of the frame body and the filter member.

15. The pressure control device according to claim 1, wherein the widened part comprises:
a receiving part which is formed to have a depth larger than a depth of the groove part and which a part of the filter unit enters.

* * * * *